(12) United States Patent
Bianconcini et al.

(10) Patent No.: US 12,026,953 B2
(45) Date of Patent: Jul. 2, 2024

(54) SYSTEMS AND METHODS FOR UTILIZING MACHINE LEARNING FOR VEHICLE DETECTION OF ADVERSE CONDITIONS

(71) Applicant: Verizon Patent and Licensing Inc., Basking Ridge, NJ (US)

(72) Inventors: Tommaso Bianconcini, Florence (IT); Leonardo Sarti, Florence (IT); Leonardo Taccari, Florence (IT); Francesco Sambo, Florence (IT); Fabio Schoen, Florence (IT); Enrico Civitelli, Arezzo (IT); Simone Magistri, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 355 days.

(21) Appl. No.: 17/447,510

(22) Filed: Sep. 13, 2021

(65) Prior Publication Data

US 2023/0077516 A1 Mar. 16, 2023

(51) Int. Cl.
*G06V 20/56* (2022.01)
*G06V 10/44* (2022.01)
*G06V 10/82* (2022.01)

(52) U.S. Cl.
CPC ............ *G06V 20/56* (2022.01); *G06V 10/454* (2022.01); *G06V 10/82* (2022.01)

(58) Field of Classification Search
None
See application file for complete search history.

(56) References Cited

U.S. PATENT DOCUMENTS

| 2007/0205937 A1* | 9/2007 | Thompson | G01S 7/414 342/159 |
| 2015/0339811 A1* | 11/2015 | Zhong | G06V 20/56 382/104 |
| 2017/0154425 A1* | 6/2017 | Pierce | G06N 3/084 |

(Continued)

FOREIGN PATENT DOCUMENTS

CN 113033687 A * 6/2021

OTHER PUBLICATIONS

Fahmy, Maged MM. "Neural Network Approach to variable vehicle speed limitation upon weather conditions." 2008 International Conference on Computer Engineering & Systems. IEEE, 2008. (Year: 2008).*

(Continued)

*Primary Examiner* — Michelle M Entezari Hausmann

(57) ABSTRACT

In some implementations, an adverse environment detection system may receive an image of a road scene associated with a vehicle. The adverse environment detection system may determine a set of features associated with the image based on providing the image to an initial portion of a model. The adverse environment detection system may determine a first condition associated with the image based on providing the set of features to a first processing layer of the model, a second condition associated with the image based on providing the set of features to a second processing layer of the model, and a third condition associated with the image based on providing the set of features to a third processing layer of the model. The first processing layer, the second processing layer, and the third processing layer may process the set of features in parallel.

20 Claims, 11 Drawing Sheets

(56) References Cited

U.S. PATENT DOCUMENTS

| | | | |
|---|---|---|---|
| 2017/0161590 A1* | 6/2017 | Boulkenafed | G06F 18/24143 |
| 2018/0157963 A1* | 6/2018 | Salti | G06N 3/045 |
| 2018/0239975 A1* | 8/2018 | Tamrakar | G06V 40/171 |
| 2019/0375261 A1* | 12/2019 | Johansson | B60W 40/06 |
| 2021/0150228 A1* | 5/2021 | Goforth | B60W 30/0956 |
| 2021/0334662 A1* | 10/2021 | Kim | G06N 3/082 |
| 2021/0406674 A1* | 12/2021 | Wu | G06N 3/04 |
| 2022/0270901 A1* | 8/2022 | Sadeghi | G05B 19/41875 |
| 2022/0344184 A1* | 10/2022 | Sadeghi | G01B 11/02 |
| 2024/0029271 A1* | 1/2024 | Huang | G06V 20/64 |

OTHER PUBLICATIONS

English Abstract + Machine Translation: CN113033687A (Year: 2021).*
Xu, Dan, et al. "Pad-net: Multi-tasks guided prediction-and-distillation network for simultaneous depth estimation and scene parsing." Proceedings of the IEEE Conference on Computer Vision and Pattern Recognition. 2018. (Year: 2018).*
Crawshaw, Michael. "Multi-task learning with deep neural networks: A survey." arXiv preprint arXiv:2009.09796 (2020). (Year: 2020).*
Singh, "Critical Reasons for Crashes Investigated in the National Motor Vehicle Crash Causation Survey," National Highway Traffic Safety Administration' National Center for Statistics and Analysis, U.S. Department of Transportation, Mar. 2018, 3 pages.
Yurtsever, "A Survey of Autonomous Driving: Common Practices and Emerging Technologies," IEEE Access, vol. 8, 2020, 28 pages.
Kim et al., "Advisable Learning for Self-driving Vehicles by Internalizing Observation-to-Action Rules," IEEE/CVF Conference on Computer Vision and Pattern Recognition (CVPR), 2020, 10 pages.
Yoneda et al., "Automated driving recognition technologies for adverse weather conditions," IATSS Research, vol. 43, Nov. 2019, 10 pages.
Taccari et al., "Classification of crash and near-crash events from dashcam videos and telematics," 2018 21st International Conference on Intelligent Transportation Systems (ITSC), Nov. 2018, 6 pages.
Ibrahim et al., "Weathernet: Recognising Weather and Visual Conditions from Street-Level Images Using Deep Residual Learning," ISPRS International Journal of Geo-Information, vol. 8, No. 12, 2019, 18 pages.
He et al., "Deep Residual Learning for Image Recognition," IEEE Conference on Computer Vision and Pattern Recognition (CVPR), 2016, 9 pages.
Zhao et al., "A CNN-RNN Architecture for Multi-Label Weather Recognition," Neurocomputing, vol. 322, 2018, 29 pages.
Villarreal Guerra et al., "Weather classification: A new multi-class dataset, data augmentation approach and comprehensive evaluations of convolutional neural networks," NASA/ESA Conference on Adaptive Hardware and Systems (AHS), 2018, 6 pages.
Lin et al., "RSCM: Region Selection and Concurrency Model for Multi-Class Weather Recognition," IEEE Transactions on Image Processing, vol. 26, No. 9, Sep. 2017, 14 pages.
Abdi'c et al., "Detecting road surface wetness from audio: A deep learning approach," 2016 23rd International Conference on Pattern Recognition (ICPR), 5 pages.
Weber et al., "Recognition Evaluation of Additional Traffic Signs on the Example of '80 km/h When Wet'," 2019 IEEE Intelligent Transportation Systems Conference (ITSC), Oct. 2019, 6 pages.
Zuraulis et al., "Technological Measures of Forefront Road Identification for Vehicle Comfort and Safety Improvement," Transport, vol. 34, Issue 3, 2019, 10 pages.
Qian et al., "Evaluating Features and Classifiers for Road Weather Condition Analysis," 2016 IEEE International Conference on Image Processing (ICIP), 5 pages.
Zhao et al., "Road Surface State Recognition Based on SVM Optimization and Image Segmentation Processing," Journal of Advanced Transportation, vol. 2017, 21 pages.
Cortes et al., "Support-Vector Networks," Machine Learning, vol. 20, No. 3, 1995, 25 pages.
Bromley et al., "Signature Verification using a "Siamese" Time Delay Neural Network," Proceedings of the 6th International Conference on Neural Information Processing Systems, 1993, 8 pages.
Simonyan et al., "Very Deep Convolutional Networks for Large-Scale Image Recognition," 3rd International Conference on Learning Representations, Apr. 2015, 14 pages.
Yu et al., "BDD100K: A Diverse Driving Dataset for Heterogeneous Multitask Learning," IEEE Conference on Computer Vision and Pattern Recognition (CVPR), 2020, 14 pages.
Sandler et al., "MobileNetV2: Inverted Residuals and Linear Bottlenecks," IEEE Conference on Computer Vision and Pattern Recognition (CVPR), 2018, 14 pages.
Selvaraju et al., "Grad-CAM: Visual Explanations from Deep Networks via Gradient-based Localization," IEEE International Conference on Computer Vision, 2017, 23 pages.
Paszke et al., "PyTorch: An Imperative Style, High-Performance Deep Learning Library," 33rd Conference on Neural Information Processing Systems, 2019, 12 pages.
Deng et al., "ImageNet: A Large-Scale Hierarchical Image Database," IEEE Conference on Computer Vision and Pattern Recognition, 2009, 2 pages.
Kingma et al., "Adam: A Method for Stochastic Optimization," 3rd International Conference on Learning Representations, 2015, 15 pages.
Shanmugam et al., "When and Why Test-Time Augmentation Works," 2020, 9 pages.

* cited by examiner

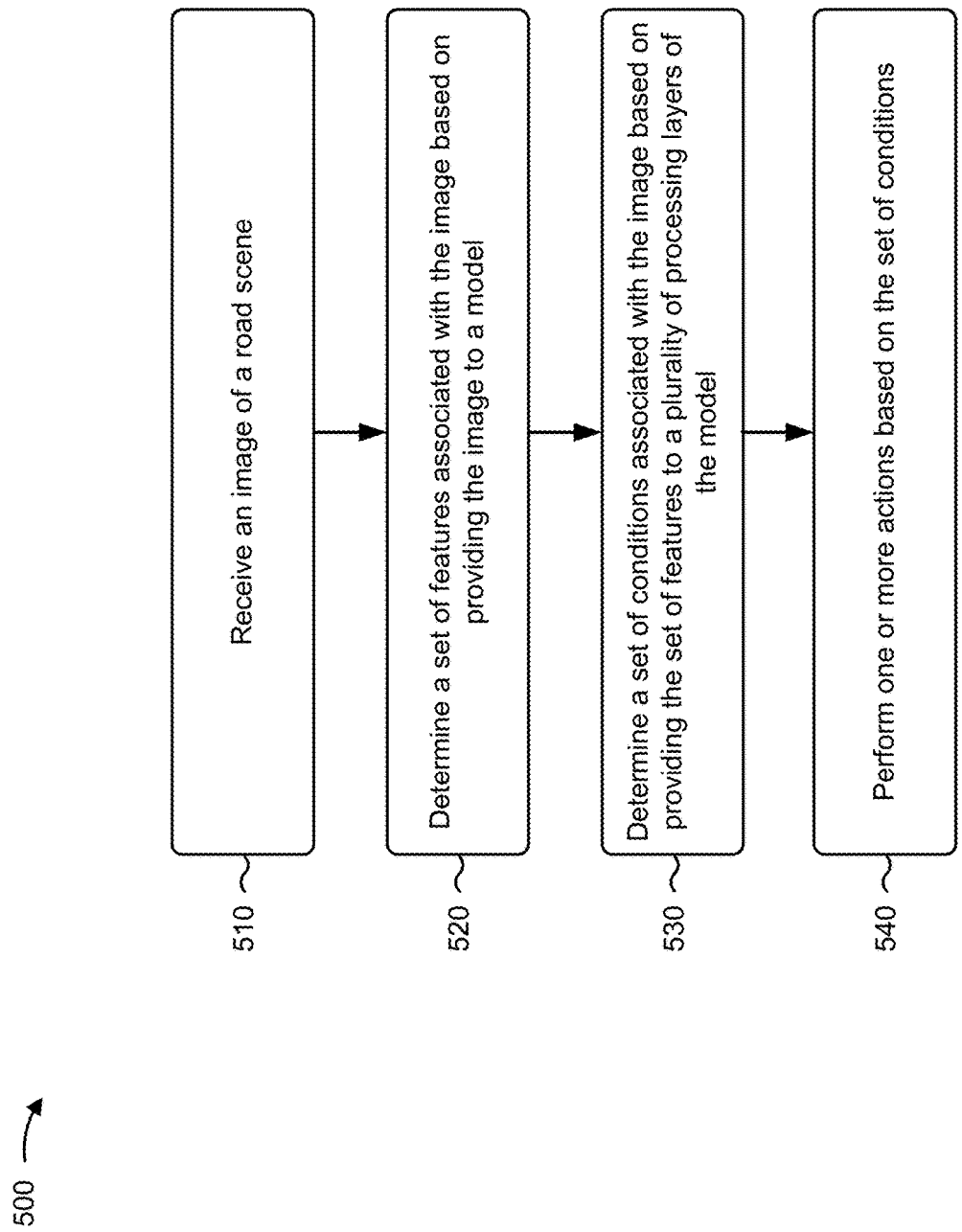

SYSTEMS AND METHODS FOR UTILIZING MACHINE LEARNING FOR VEHICLE DETECTION OF ADVERSE CONDITIONS

BACKGROUND

Vehicles may be equipped with several vehicle devices that enable capture of images or video surrounding the vehicle. For example, a vehicle may include a dash camera, a parking assist camera, a backup assist camera, an on-board diagnostic (OBD) device, an electronic control unit (ECU), and/or the like that enable the capture of images or video for different purposes.

BRIEF DESCRIPTION OF THE DRAWINGS

FIG. 5 is a flowchart of an example process relating to utilizing machine learning for vehicle detection of adverse conditions.

DETAILED DESCRIPTION OF PREFERRED EMBODIMENTS

Figure 1A:
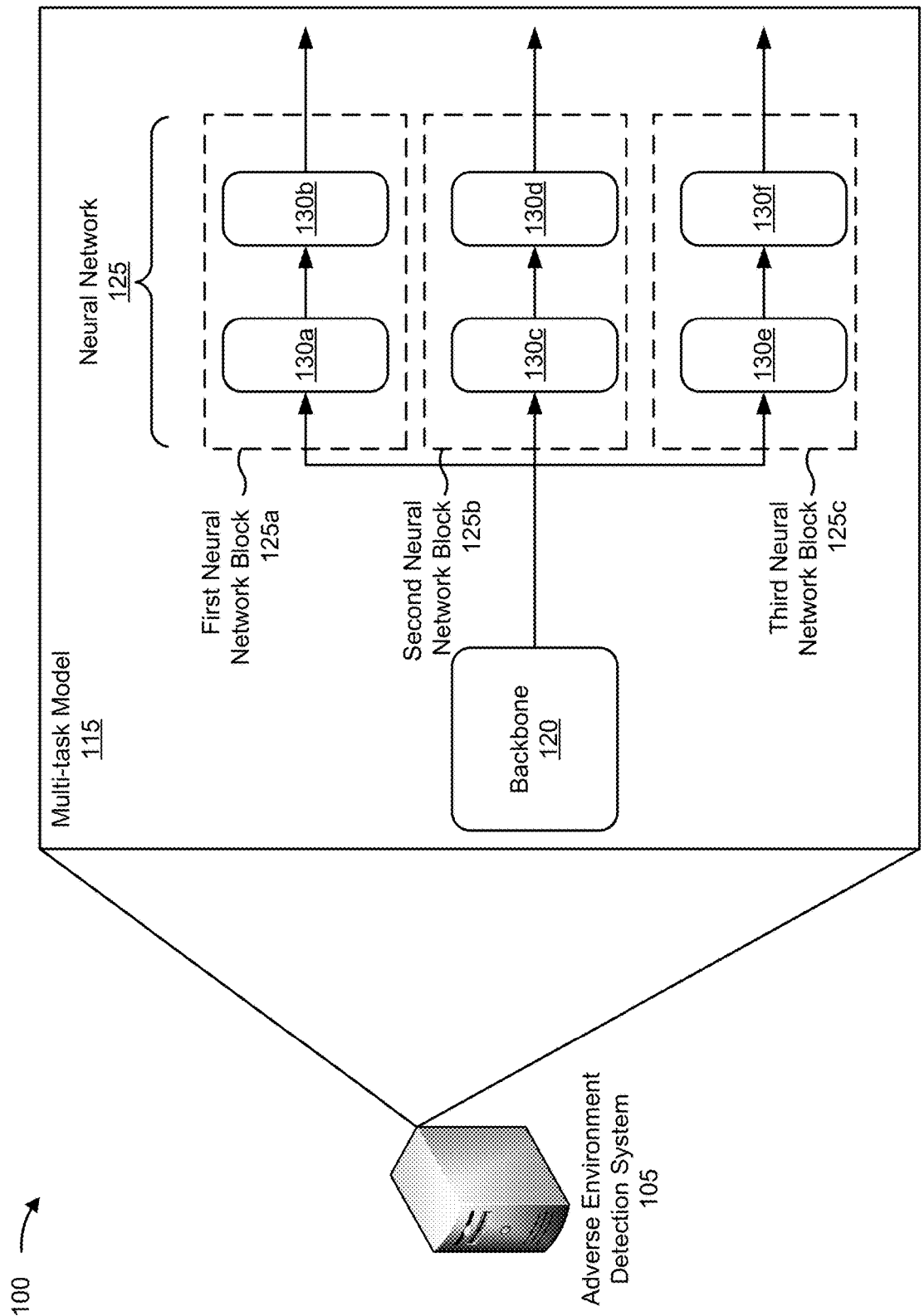
FIGS. 1A-1F are diagrams of an example associated with utilizing machine learning for vehicle detection of adverse conditions.

The following detailed description of example implementations refers to the accompanying drawings. The same reference numbers in different drawings may identify the same or similar elements.

Adverse weather and road conditions may impact visibility, road surface friction, and vehicle responsiveness, which may increase driving risk (e.g., a risk of a vehicle being involved in an accident).

Adverse weather and road conditions increase driving risk (e.g., a risk of a vehicle being involved in an accident), since they can impact visibility, road surface friction, and vehicle responsiveness. Thus, an estimator of the general condition of the surrounding environment (road status, weather, general visibility) is of considerable interest for safety-critical applications like autonomous driving and/or fleet management platforms.

In semi or fully autonomous driving, an adverse environment detection system may have two main objectives. The first main objective may be to generate observations about a road scene (e.g. the road is icy) that can be used by a vehicle controller to control an operation of a vehicle according to the present driving conditions (e.g. the power of the engine can be limited in case of rain or the anti-lock braking system (ABS) responsiveness can be increased when ice is present on the road). The second main objective may be associated with autonomous vehicle equipment. For example, some sensors (e.g., light detection and ranging (LIDAR) and/or a camera, among other examples) may be affected by environmental factors, such as rain and/or snow. Detecting these environmental factors may allow the adverse environment detection system to utilize measurements obtained by another sensor to correct measurements obtained by the affected sensors.

An adverse environment detection system in the autonomous vehicle context should guarantee high reliability and responsiveness. However, despite the significant computational power typically available in autonomous vehicles, it is desirable to maintain such systems as utilizing as few computing resources as possible in order to keep the computing resources available for other tasks. Additionally, in some cases, a vehicle may have limited computational power and/or hardware (e.g., a non-autonomous vehicle and/or a vehicle having more simple devices such as a dashcam, a back-up camera, and/or the like).

Further, to accurately determine adverse weather conditions that may affect an operation of a vehicle, an adverse environment detection system should determine a current weather condition, a current road condition, and a current visibility condition. However, an adverse environment detection system may only detect the current weather condition or the current road condition, while failing to consider the visibility condition.

Some implementations described herein enable an adverse environment detection system that utilizes machine learning to detect adverse conditions based on a current road condition, a current weather condition, and a current visibility condition. For example, the adverse environment detection system may receive an image of a road scene associated with a vehicle. The adverse environment detection system may determine a set of features associated with the image based on providing image data corresponding to the image to a backbone portion of a multi-task model. The set of features may be provided to a first processing layer, a second processing layer, and a third processing layer of the multi-task model. The first, second, and third processing layers may process the set of features, in parallel, to determine a current road condition, a current weather condition, and a current visibility condition, respectively. The adverse environment detection system may cause information relating to the current road condition, the current weather condition, and the current visibility condition to be provided to user device of a user, such as user device of a driver of the vehicle and/or a user device of a fleet manager associated with the vehicle, among other examples.

Additionally, as described in greater detail herein, the multi-task model may be trained to solve three tasks (e.g., to determine a current road condition, a current weather condition, and a current visibility condition) concurrently. Further, a multi-task model trained to solve multiple tasks at the same time outperforms (e.g., in terms of accuracy, speed, and computing resource utilization) a system utilizing multiple, single-task models to solve the multiple tasks. As an example, a multi-task model based on MobileNetV2 may gain at least 0.4 points in terms of mean average precision (mAP) relative to utilizing single-task models based on MobileNetV2.

Further, the multi-task model may be a lighter weight model (e.g., a model having fewer layers in a neural network of the model) having a performance comparable to a heavier model (e.g., a model having a greater quantity of layers in a neural network of the model) but may produce results multiple times faster than the heavier model. For example, a multi-task model based on MobileNetV2 may have an mAP of about 93.2 points and a multi-task model based on ResNet50 may have an mAP of about 93.4 points. However, the multi-task model based on MobileNetV2 may generate a result in about 0.02 seconds while the multi-task model based on ResNet50 may generate a result in about 0.1 seconds. Because the multi-task model is a lighter weight model, the multi-task model can be implemented on an edge device of a multi-access edge computing (MEC) environment (described in greater detail below), a vehicles and/or devices having significant computational power, as well as on vehicles having only more simple devices, such as a dashcam.

FIGS. 1A-1F are diagrams of an example 100 associated with utilizing machine learning to detect adverse conditions. As shown in FIGS. 1A-1F, example 100 includes an adverse environment detection system 105 associated with a vehicle device 110 and a multi-task model 115. The multi-task model 115 may be configured to detect a current road condition, a current weather condition, and a current visibility condition, as described in greater detail herein.

In some implementations, the adverse environment detection system 105 may be included in a vehicle. For example, the adverse environment detection system 105 may be included in an autonomous driving system of a vehicle. In some implementations, the adverse environment detection system 105 may be included in a user device, such as a smart phone. Alternatively, and/or additionally, the adverse environment detection system 105 may be included in an edge device of a multi-access edge computing (MEC) environment. In a MEC environment, computing is enabled by a network architecture that provides computing capabilities to a connected device (e.g., a vehicle device 110 such as an autonomous driving system, a dashcam, a parking assist camera, and/or a backup camera, among other examples) via computing platforms at or near an edge of a network (e.g., a wireless communication network).

Accordingly, because a MEC environment may provide computing at or near the edge of the network, increased performance may be achieved over networks in which computing is performed topologically and/or physically further from a connected device. For example, the MEC environment may offer improved performance due to less traffic and/or congestion between the connected device and the computing node(s), less latency (due to closer proximity to the connected device), and/or increased flexibility (due to a greater amount of computing node(s)).

As shown in FIG. 1A, the multi-task model 115 may include a backbone 120 and a neural network 125. The backbone 120 may be configured to receive an image of a road scene as an input and to process the image to generate a set of features representing one or more objects depicted in the image. In some implementations, the backbone 120 includes a convolutional neural network (CNN) architecture, such as a ResNet or a MobileNet V2 architecture, among other examples.

The neural network 125 may include a plurality of neural network blocks. In some implementations, as shown in FIG. 1A, the neural network 125 may include a first neural network block 125a, a second neural network block 125b, and a third neural network block 125c. Although the neural network 125 is shown as having a particular quantity of neural network blocks, in some implementations, the neural network 125 may include different quantities and/or arrangements of neural network blocks.

The first neural network block 125a may be configured to receive an output of the backbone 120 (e.g., the set of features) and to process the output to determine a road condition of a road depicted in the image. In some implementations, the first neural network block 125a may include a multi-layer perceptron. The multi-layer perceptron may include a plurality of sequential, linear layers. For example, as shown in FIG. 1A, the multi-layer perceptron may include linear layer 130a and linear layer 130b.

In some implementations, the quantity of linear layers included in a neural network block may be based on an amount of computer resources available to the multi-task model 115 and/or the neural network 125. For example, a multi-task model 115 included in an autonomous vehicle may include a neural network 125 having a neural network block with a large quantity of linear layers relative to a quantity of linear layers included in a neural network block of a multi-task model 115 in a vehicle having fewer computing resources available to the multi-task model 115. By modifying the quantity of linear layers in the neural network blocks included in the neural network 125, the multi-task model 115 may be configured based on an amount of computing resources available to the multi-task model 115, which may enable the multi-task model 115 to be implemented in devices with limited computing resources.

The first neural network block 125a (e.g., the linear layer 130a and the linear layer 130b) may comprise a multi-layer neural network that is configured to generate an output indicating a road condition based on the set of features. For example, the first neural network block 125a may generate an output indicating a wet road condition, a dry road condition, and/or a snowy road condition, among other examples, based on processing the set of features, as described in greater detail herein.

In some implementations, a quantity of neurons included in the first linear layer 130a may be based on a quantity of features included in the output of the backbone 120 and/or a quantity of computing resources available to the multi-task model 105, among other examples. In some implementations, the output of the backbone 120 includes 1,280 features and the first linear layer 130a includes 160 neurons.

In some implementations, the quantity of neurons included in the last linear layer (e.g., linear layer 130b) of the first neural network block 125a is based on a task associated with the first neural network block 125a. As an example, the first neural network block 125a may be configured to classify an image based on three classifications of road conditions (e.g., a dry road condition, a wet road condition, and a snowy road condition). The last linear layer (e.g., linear layer 130b) of the first neural network block 125a may include three neurons based on the first neural network block 125a being configured to classify an image based on three classifications of road conditions.

The second neural network block 125b may be configured to receive the output of the backbone 120 and to process the output to determine a weather condition of the road depicted in the image. In some implementations, the second neural network block 125b may include a multi-layer perceptron. The multi-layer perceptron may include a plurality of sequential, linear layers. For example, as shown in FIG. 1A, the multi-layer perceptron may include linear layer 130c and linear layer 13d. The quantity of linear layers may be the same as, or different than, the quantity of linear layers of the multi-layer perceptron of the first neural network block 125a.

The second neural network block 125b (e.g., the linear layer 130c and the linear layer 130d) may comprise a multi-layer neural network that is configured to generate an output indicating a weather condition based on the set of features. For example, the second neural network block 125b may generate an output indicating a clear weather condition, an overcast weather condition, a snowy weather condition, a rainy weather condition, a cloudy weather condition, and/or a foggy weather condition, among other examples, based on processing the set of features, as described in greater detail herein.

In some implementations, a quantity of neurons included in the first linear layer 130c of the second neural network block 125b may be based on a quantity of features included in the output of the backbone 120 and/or a quantity of computing resources available to the multi-task model 105, among other examples. In some implementations, the output of the backbone 120 includes 1,280 features and the first linear layer 130c includes 160 neurons.

In some implementations, the quantity of neurons included in the last linear layer (e.g., linear layer 130d) of the second neural network block 125b is based on a task associated with the second neural network block 125b. As an example, the second neural network block 125b may be configured to classify an image based on three classifications of weather conditions (e.g., a clear weather condition, an overcast weather condition, and a snowy weather condition). The last linear layer (e.g., linear layer 130d) of the second neural network block 125b may include three neurons based on the second neural network block 125b being configured to classify an image based on three classifications of weather conditions.

The third neural network block 125c may be configured to receive the output of the backbone 120 and to process the output to determine a visibility condition depicted in the image. In some implementations, the third neural network block 125c may include a multi-layer perceptron. The multi-layer perceptron may include a plurality of sequential, linear layers. For example, as shown in FIG. 1A, the multi-layer perceptron may include linear layer 130e and linear layer 13f. The quantity of linear layers may be the same as, or different than, the quantity of linear layers of the multi-layer perceptron of the first neural network block 125a and/or the quantity of linear layers of the multi-layer perceptron of the second neural network block 125b.

The third neural network block 125c (e.g., the linear layer 130e and the linear layer 130f) may comprise a multi-layer neural network that is configured to generate an output indicating a visibility condition based on the set of features. For example, the third neural network block 125c may generate an output indicating a poor visibility condition and/or a good visibility condition, as described in greater detail herein. The poor visibility condition may indicate that rain drops, snowflakes, and/or dirt, among other examples, are present on a windshield of the vehicle and/or may affect the visibility of the driver of the vehicle. The good visibility condition may indicate that rain drops, snowflakes, and/or dirt, among other examples, are not present on the windshield of the vehicle.

In some implementations, a quantity of neurons included in the first linear layer 130e of the third neural network block 125c may be based on a quantity of features included in the output of the backbone 120 and/or a quantity of computing resources available to the multi-task model 105, among other examples. In some implementations, the output of the backbone 120 includes 1,280 features and the first linear layer 130e includes 160 neurons.

In some implementations, the quantity of neurons included in the last linear layer (e.g., linear layer 130f) of the third neural network block 125c is based on a task associated with the third neural network block 125c. As an example, the third neural network block 125c may be configured to classify an image based on a single classification of visibility conditions (e.g., a poor visibility condition). The third neural network block 125c may be configured to classify an image as being associated with a good visibility condition when the image is not classified as being associated with the poor visibility condition. The last linear layer (e.g., linear layer 130f) of the third neural network block 125c may include one neuron based on the third neural network block 125c being configured to classify an image based on a single classification of visibility conditions.

Figure 1B:
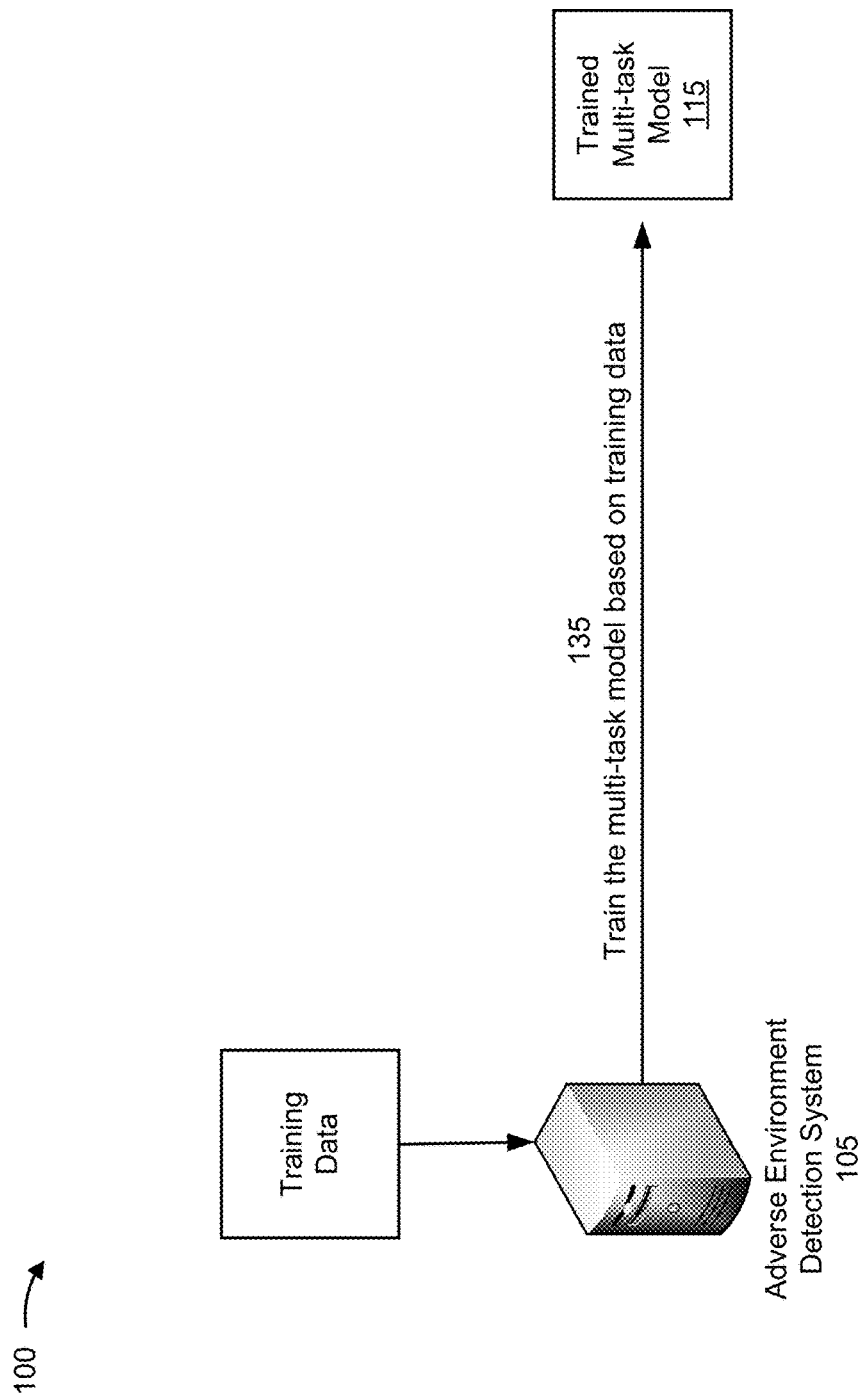

As shown in FIG. 1B, and by reference number 135, the adverse environment detection system 105 may train the multi-task model 115 based on training data associated with detecting adverse environment conditions and to generate a trained multi-task model 115. In some implementations, the logging system may train the one or more recommendation models to classify the event data and/or to generate the recommendation. The multi-task model 115 may be trained based on images depicting road scenes of vehicles. The multi-task model 115 may be trained to determine, based on an image of a road scene, a road condition, a weather condition, and a visibility condition with which the road scene is associated, a confidence score that reflects a measure of confidence that the road condition is accurate for this image, a confidence score that reflects a measure of confidence that the weather condition is accurate for this image, and/or a confidence score that reflects a measure of confidence that the visibility condition is accurate for this image. In some implementations, the multi-task model 115 may be trained to determine the road condition, the weather condition, and the visibility condition in parallel.

In some implementations, the adverse environment detection system 105 may train the multi-task model 115 in a manner similar to that described below with respect to FIGS. 2A and 2B. Alternatively, and/or additionally, the adverse environment detection system 105 may obtain a trained multi-task model 115 from another device.

Figure 1C:
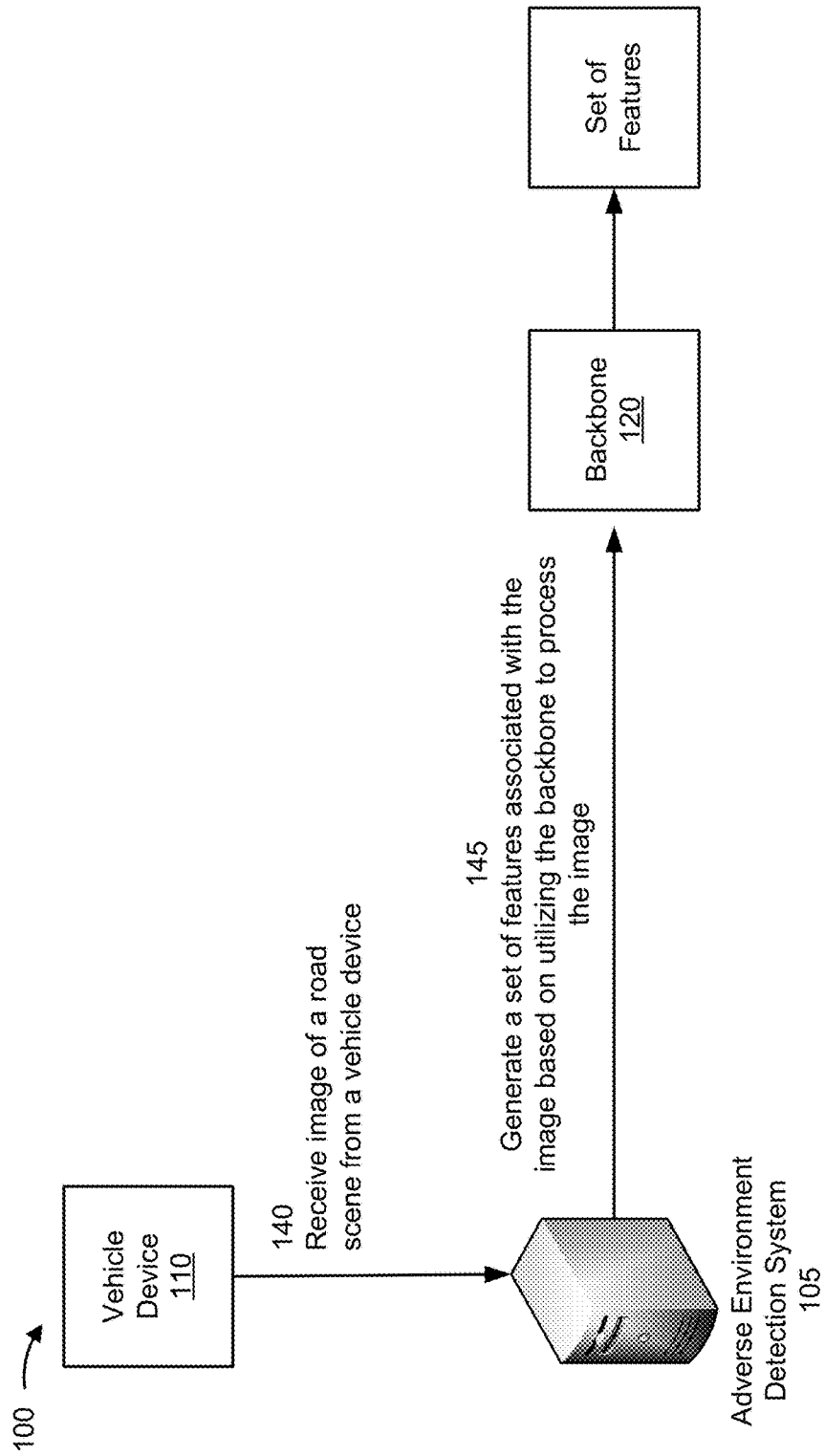

As shown in FIG. 1C, and by reference number 140, the adverse environment detection system 105 may receive an image of a road scene from the vehicle device 110. For example, the vehicle device 110 may be a dashcam, a camera included on a user device (e.g., a smart phone, a tablet, and/or a laptop computer, among other examples), and/or another type of device configured to obtain one or more images and/or video depicting a road scene (e.g., a scene of an environment through which the vehicle is traveling). The vehicle device 110 may provide the image to the adverse environment detection system 105 periodically and/or upon detecting an occurrence of a harsh driving event (e.g., hard braking), among other examples.

The adverse environment detection system 105 may provide the image, as an input, to the multi-task model 115 based on receiving the image from the vehicle device 110. As shown by reference number 145, the adverse environment detection system 105 (e.g., the multi-task model 115) may generate a set of features associated with the image based on utilizing the backbone 120 to process the image.

Figure 1D:
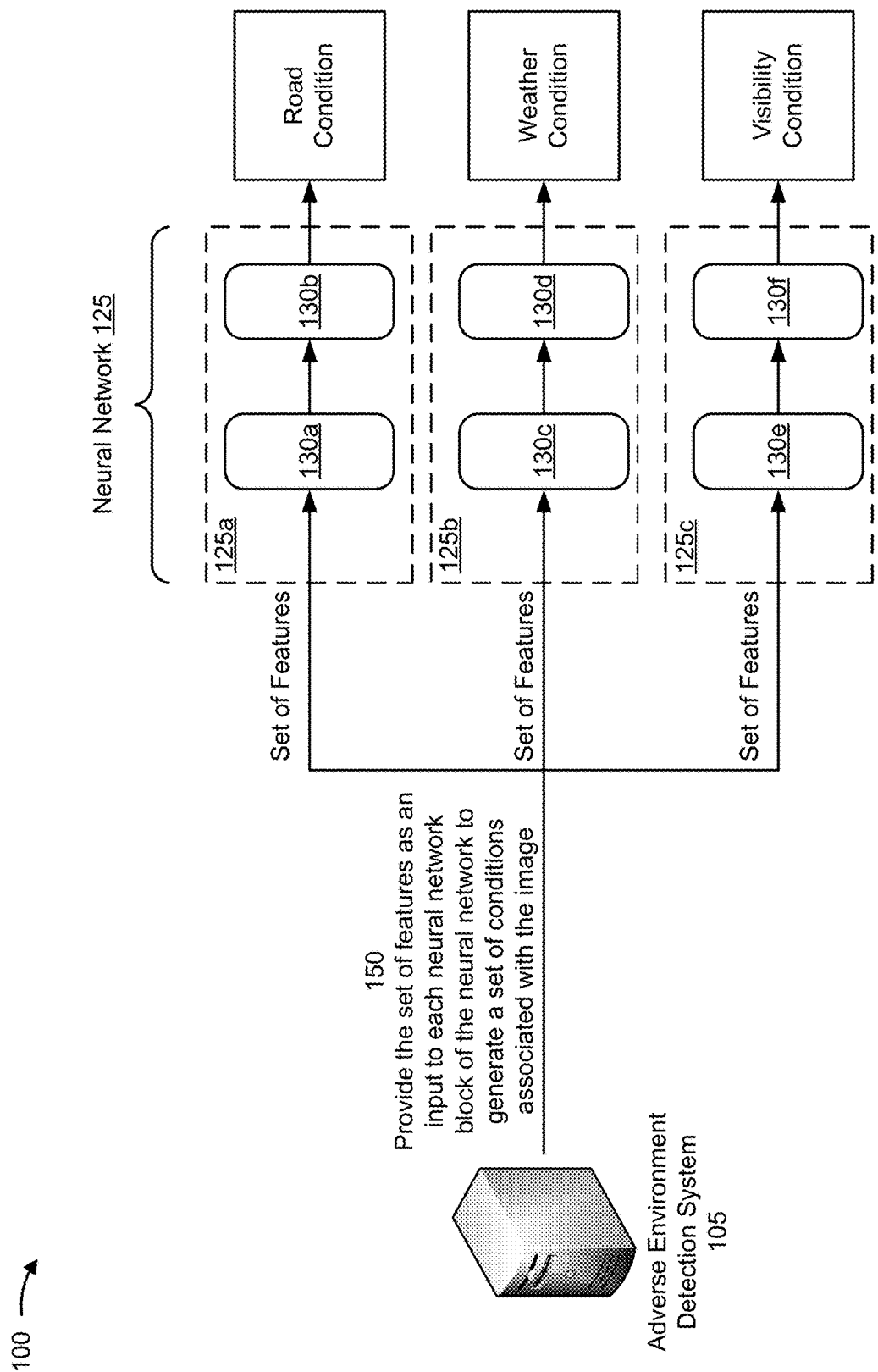

As shown in FIG. 1D, and by reference number 150, the adverse environment detection system 105 (e.g., the backbone 120) may provide the set of features, as an input, to each layer (e.g., the first neural network block 125a, the second neural network block 125b, and the third neural network block 125c) of the neural network 125. The first neural network block 125a, the second neural network block 125b, and the third neural network block 125c may process the set of features, in parallel, to generate a first output indicating a road condition associated with the image, a second output indicating a weather condition associated with the image, and a third output indicating a visibility condition associated with the image, respectively.

In some implementations, the set of features includes a vector representation of the image. The vector representation may include a quantity of values indicating respective features detected within the image. Each first linear layer (e.g., linear layer 130a, linear layer 130c, and linear layer 130e) may process the set of features to generate a plurality of different combinations of features included in the set of features. For example, the set of features may include a first quantity of values (e.g., the vector representation may have a dimension (e.g., a first quantity of values) of 640, 1280, or 2560, among other examples) and each first linear layer may generate a second quantity (e.g., 1, 10, 30, 60, and/or 120, among other examples) of combinations of features included in the set of features.

In some implementations, the first quantity of values is based on a type of neural network of which the backbone 120 is composed, a resolution of the image (e.g., the backbone portion may generate a set of vectors having a larger quantity of values for a first image relative to a quantity of values generated for a second image based on the first image having a higher resolution relative to the second image), a level of accuracy associated with the backbone 120 and/or the multi-task model 115, and/or a quantity of computing resources (e.g., processing resources, memory resources, and/or communication resources, among other examples) available to the adverse environment detection system 105 and/or the multi-task model 115 (e.g., the first quantity of values may be proportional to the quantity of available computing resources), among other examples. The second quantity of combinations generated by a first linear layer of a particular processing layer (e.g., the linear layer 130a, the linear layer 130c, and/or the linear layer 130e) may be based on a size of the first linear layer (e.g., a first linear layer having a larger quantity of neurons relative to another first linear layer may generate a larger quantity of combinations relative to the other first linear layer) and/or may be the same as, or different from, the second quantity of combinations generated by one or more other first linear layers of one or more other processing layers.

As shown in FIG. 1D, an output of each first linear layer (e.g., the second quantity of combinations of features) may be provided, as an input, to the respective second linear layers (e.g., linear layer 130b, linear layer, 130d, and linear layer 130f). The second linear layers may process the second quantity of combinations of features to generate an output indicating a road condition associated with the image, a weather condition associated with the image, and a visibility condition associated with the image, respectively.

In some implementations, the adverse environment detection system 105 may determine whether an adverse condition exists based on the road condition, the weather condition, and/or the visibility condition. For example, the adverse environment detection system 105 may determine a classification (e.g., safe, caution required, dangerous, dry, icy, wet, and/or slick, among other examples) for a current environmental condition associated with the vehicle and/or a score associated with the current environmental condition (e.g., a score within a range from 1 through 10, where 10 indicates a most dangerous environmental condition and 1 indicates a most safe environmental condition) based on a combination of the road condition, the weather condition, and/or the visibility condition.

As an example, the adverse environment detection system 105 may determine respective scores associated with the road condition, the weather condition, and/or the visibility condition. The scores may indicate a likelihood that the road condition, the weather condition, and/or the visibility condition will contribute to an adverse road condition. For example, the adverse environment detection system 105 may determine a first score for a dry road condition that is lower than a second score determined for a wet road condition based on the wet road condition being more likely to contribute to an adverse road condition relative to the dry road condition.

The adverse environment detection system 105 may determine the classification for the current environmental condition associated with the vehicle based on the respective scores determined for the road condition, the weather condition, and/or the visibility condition. For example, the adverse environment detection system 105 may determine whether a combination of the respective scores (e.g., a sum of the respective scores, a weighted sum of the respective scores, an average of the respective scores, and/or the like) satisfies one or more criteria (e.g., is greater than a score threshold, is less than a score threshold, crosses a score threshold, and/or the like). The adverse environment detection system 105 may determine the classification for the current environmental condition associated with the vehicle based on whether the combination of the respective scores satisfies the one or more criteria.

Figure 1E:
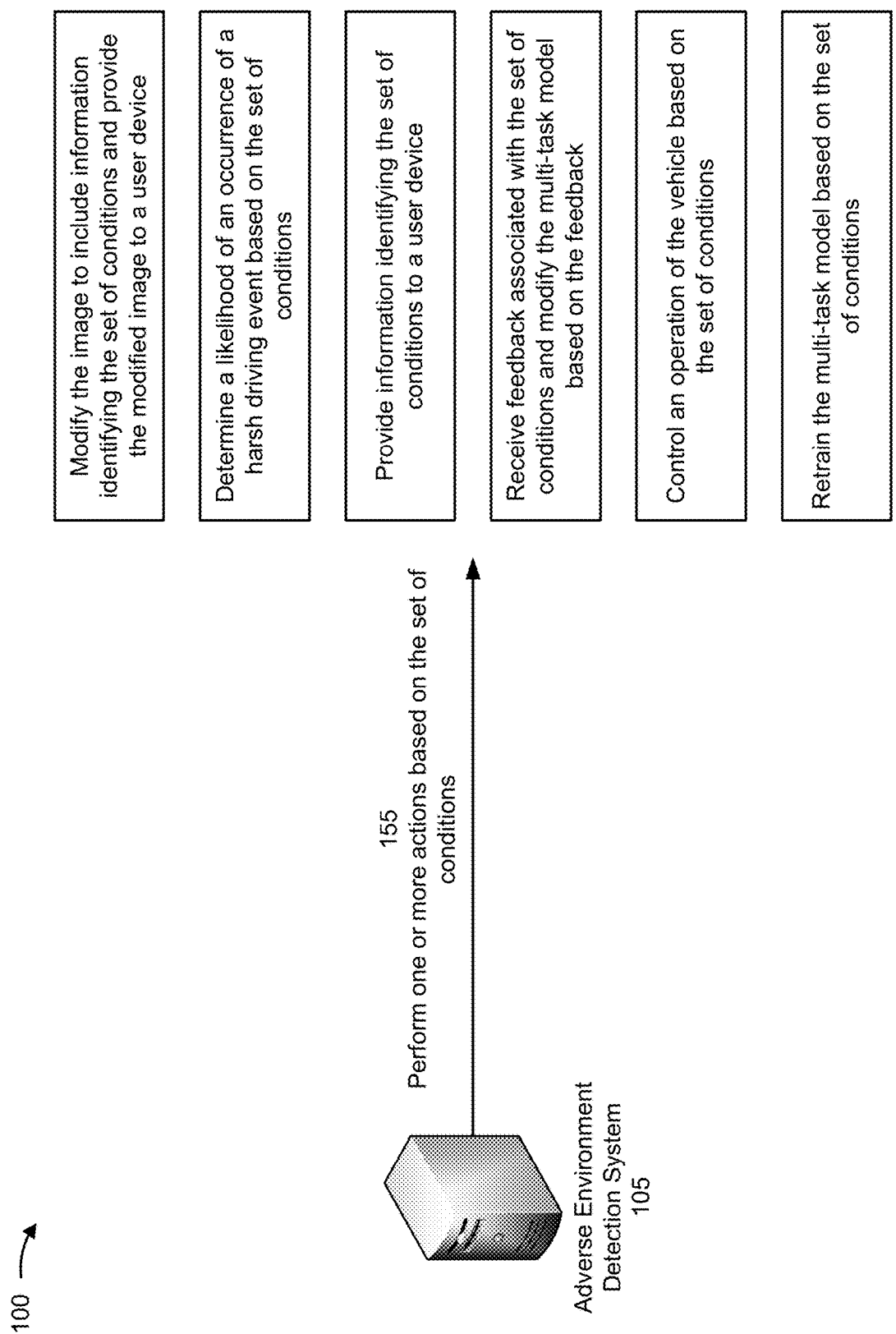

As shown in FIG. 1E, and by reference number 155, the adverse environment detection system 105 may perform one or more actions based on the set of conditions (e.g., the road condition, the weather condition, and the visibility condition). In some implementations, the one or more actions may include the adverse environment detection system 105 modifying the image to include information identifying the set of conditions and providing the modified image to a user device (e.g., the vehicle device 110, a user device associated with a driver of the vehicle, and/or a user device associated with a fleet manager associated with the vehicle, among other examples).

In some implementations, the one or more actions may include the adverse environment detection system 105 determining a likelihood of an occurrence of a harsh driving event based on the set of conditions. As an example, the adverse environment detection system 105 may be associated with an autonomous driving system and/or an ECU of the vehicle. The adverse environment detection system 105 may receive vehicle data (e.g., a speed of the vehicle, an acceleration of the vehicle, radar and/or LIDAR data indicating a location of one or more other vehicles, and/or a steering wheel angle of a steering wheel of the vehicle, among other examples). The adverse environment detection system 105 may determine an initial likelihood of an occurrence of a harsh driving event based on the vehicle data. The adverse environment detection system 105 may adjust or modify the initial likelihood based on the set of conditions. For example, the adverse environment detection system 105 may increase the initial likelihood based on the road condition indicating a wet road condition, the weather condition indicating a rainy or foggy weather condition, and/or the visibility condition indicating a poor visibility condition, among other examples. The adverse environment detection system 105 may provide information indicating the likelihood of an occurrence of a harsh driving event to the vehicle device 110 and/or a user device associated with the vehicle (e.g., a user device of a driver of the vehicle and/or a user device of a fleet manager associated with the vehicle, among other examples).

In some implementations, the one or more actions may include the adverse environment detection system 105 providing information identifying the set of conditions to a user device (e.g., the vehicle device 110, a user device of a driver of the vehicle, and/or a user device of a fleet manager associated with the vehicle, among other examples). In some implementations, the adverse environment detection system 105 may provide the information identifying the set of conditions via a display of the vehicle device 110, as described in greater detail below with respect to FIG. 1F.

In some implementations, the one or more actions may include the adverse environment detection system 105 receiving feedback associated with the set of conditions and modifying the multi-task model 115 based on the feedback. For example, a user (e.g., a driver of the vehicle) may input information indicating an accuracy of the set of conditions via a user interface provided by the vehicle device 110 and/or a user device associated with the user, among other examples. The adverse environment detection system 105 may receive the feedback from the vehicle device 110 and/or the user device and may modify the multi-task model 115 based on the feedback. In some implementations, the adverse environment detection system 105 may modify the multi-task model 115 by retraining the multi-task model 115 based on the feedback, as described in greater detail below.

In some implementations, the one or more actions may include the adverse environment detection system 105 controlling an operation of the vehicle based on the set of conditions. The adverse environment detection system 105 may be included in an autonomous driving system of the vehicle and may cause one or more actions associated with controlling the operation of the vehicle to be performed based on the set of conditions. For example, the adverse environment detection system 105 may cause a speed of the vehicle to be reduced based on the set of conditions indicating a wet road condition, a rainy weather condition, and/or a poor visibility condition, among other examples.

In some implementations, the one or more actions may include the adverse environment detection system 105 retraining the multi-task model 115 based on the set of conditions and/or the feedback. The adverse environment detection system 105 may utilize the set of conditions and/or the feedback as additional training data for retraining the multi-task model 115, thereby increasing the quantity of training data available for training the multi-task model 115. Accordingly, the adverse environment detection system 105 may conserve computing resources associated with identifying, obtaining, and/or generating historical data for training the multi-task model 115 relative to other systems for identifying, obtaining, and/or generating historical data for training machine learning models.

Figure 1F:
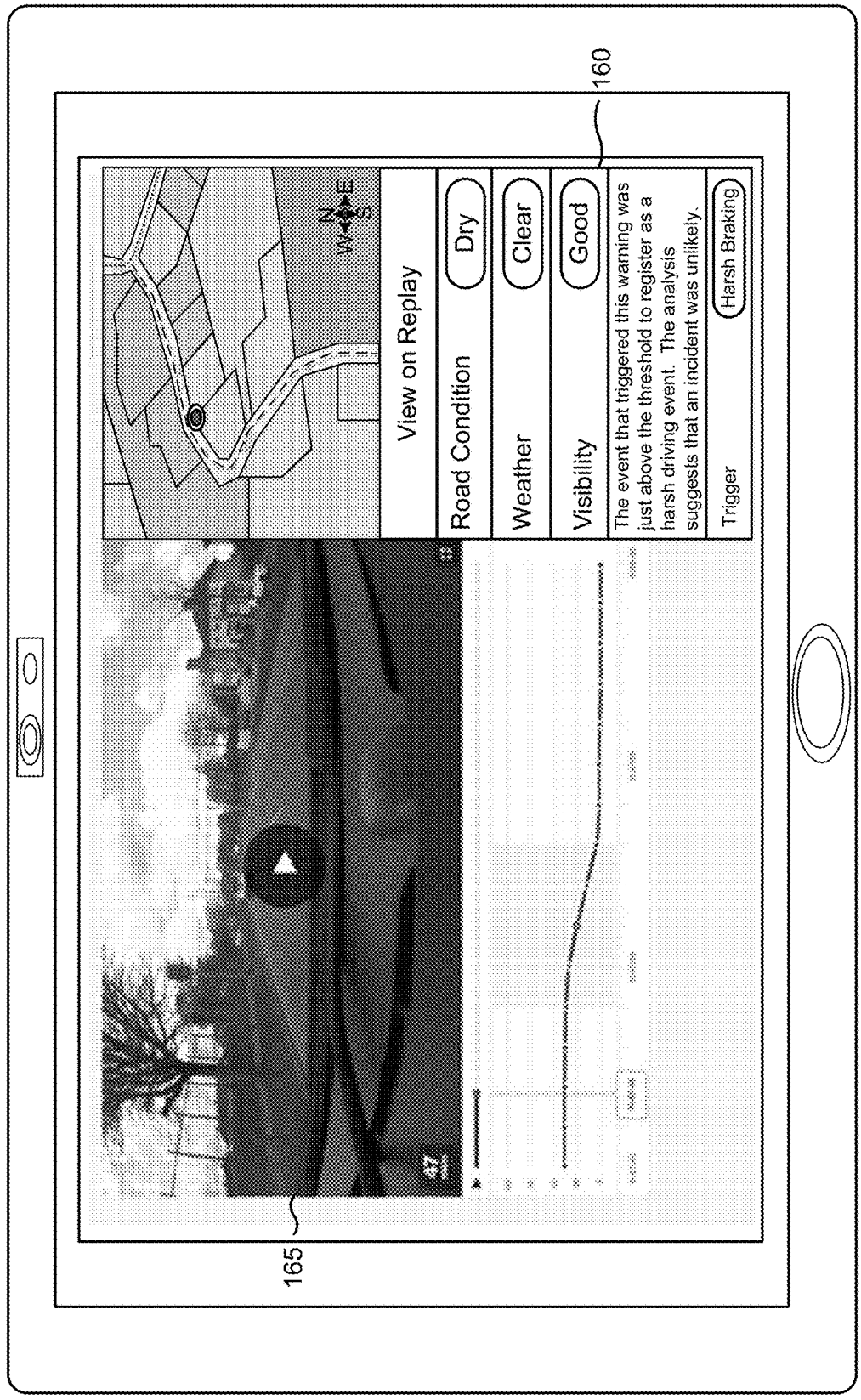

FIG. 1F is a diagram illustrating an example user interface of a vehicle device 110 displaying information identifying the set of conditions in association with vehicle data via a display of the vehicle device 110. As shown by reference number 160, the adverse environment detection system 105 may cause information identifying the set of conditions to be displayed in association with information indicating an event which triggered the display of the information.

In some implementations, as shown by reference number 165, the information identifying the set of conditions may be displayed in conjunction with the image from which the set of conditions were determined. In some implementations, as shown in FIG. 1F, the image includes video and the vehicle device 110 enables the user to watch the video to view images related to the set of conditions and/or images related to an occurrence of a harsh driving event associated with the image received by the adverse environment detection system 105.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2A:
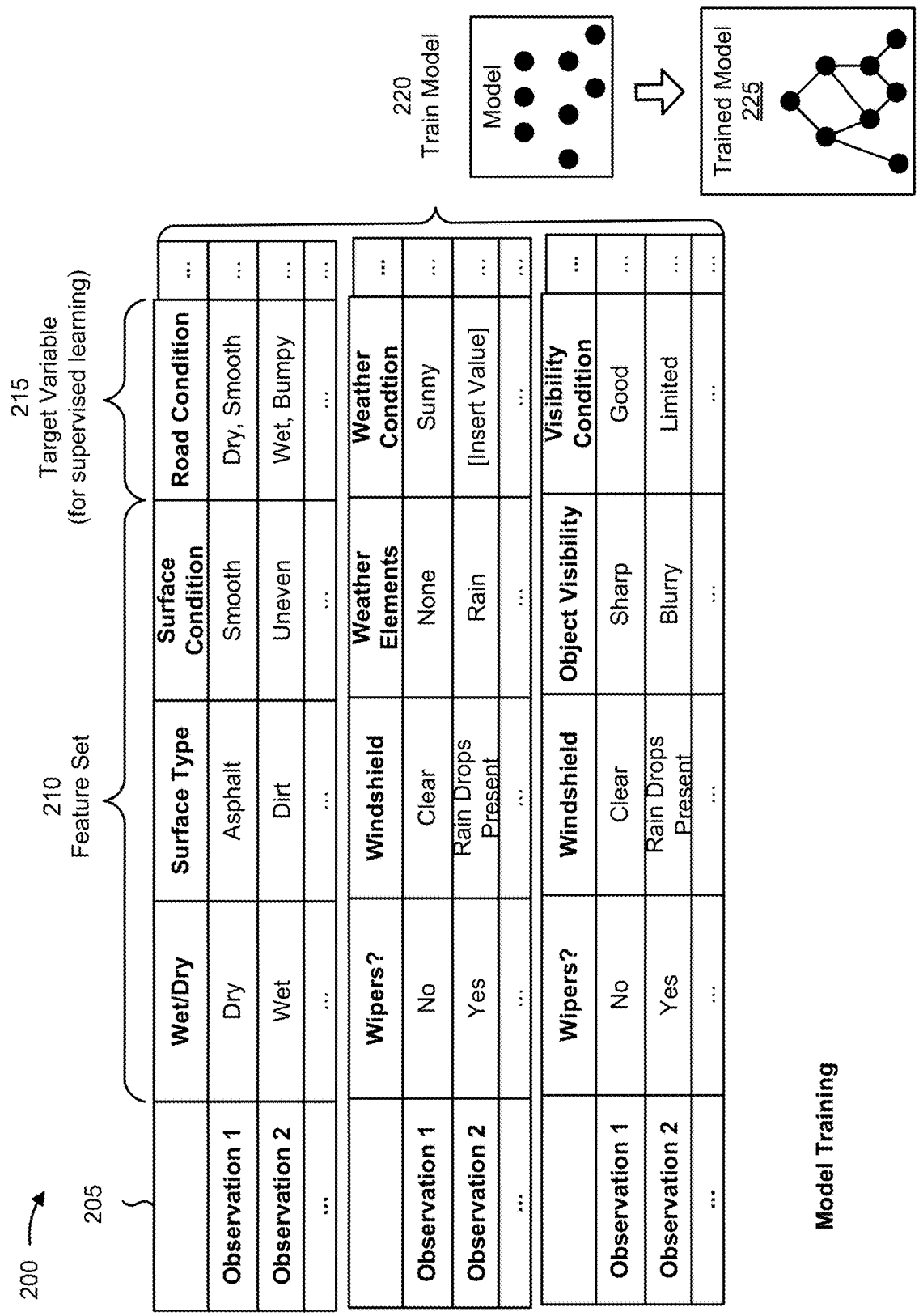
FIGS. 2A and 2B are diagrams illustrating an example of training and using a machine learning model in connection with utilizing machine learning for vehicle detection of adverse conditions.
Figure 2B:
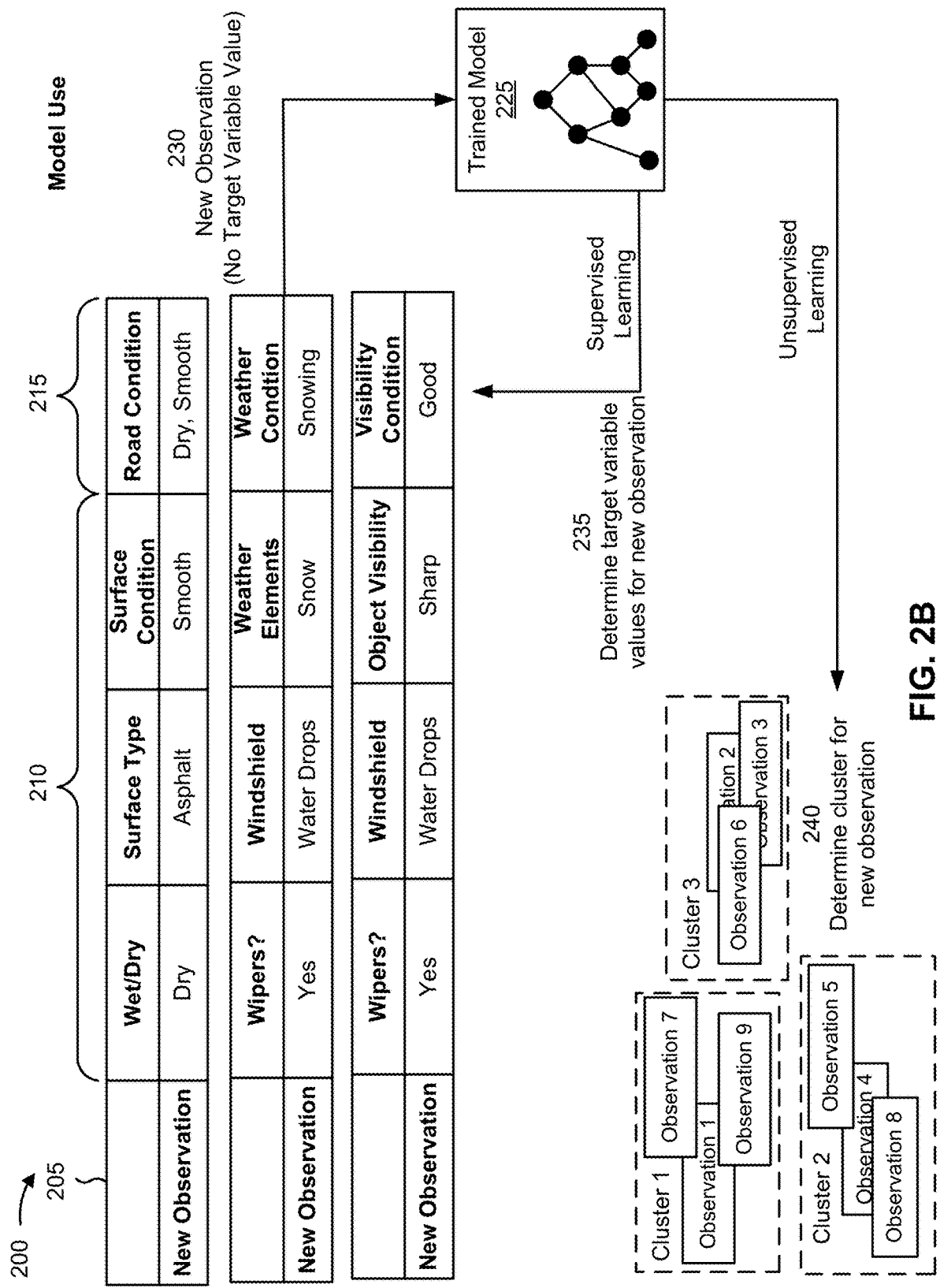

FIGS. 2A and 2B are diagrams illustrating an example 200 of training and using a machine learning model in connection with utilizing machine learning to detect adverse conditions. The machine learning model training and usage described herein may be performed using a machine learning system. The machine learning system may include or may be included in a computing device, a server, a cloud computing environment, or the like, such as the adverse environment detection system 105 described in more detail elsewhere herein.

As shown in FIG. 2A, and by reference number 205, a machine learning model (e.g., the multi-task model 115) may be trained using a set of observations. The set of observations may be obtained from training data (e.g., historical data), such as data gathered during one or more processes described herein. In some implementations, the machine learning system may receive the set of observations (e.g., as input) from adverse environment detection system 105, as described elsewhere herein.

As shown by reference number 210, the set of observations includes a feature set. The feature set may be generated by the backbone 120 and may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the adverse environment detection system 105 (e.g., the backbone 120. For example, the machine learning system may identify a feature set (e.g., one or more features and/or feature values) by extracting the feature set from an image and/or by receiving input from an operator.

As an example, a feature set for a set of observations may include a first feature set associated with a road condition, a second feature set associated with a weather condition, and a third feature a third feature set associated with a visibility condition. As shown, for a first observation of a first feature set associated with a road condition, the first feature set may a first feature of wet/dry indicating whether a surface of a road is wet or dry, a second feature of surface type indicating a material of which the surface of the road is composed, a third feature of surface condition indicating a condition (e.g., smooth, flat, and/or bumpy, among other examples) of the surface of the road, and so on. These features are provided as examples and may differ in other examples. For example, as shown in FIG. 2A, a second feature set associated with a weather conditions may include a first feature of "wipers?" indicating whether the image depicted an operation of a windshield wiper of the vehicle, a second feature of windshield indicating whether any objects (e.g., dirt, rain drops, and/or snowflakes, among other examples) are present on the windshield, a third feature of weather elements indicating whether a weather element (e.g., a rain drop, hail, and/or snow, among other examples) are depicted in the image, and so on.

As another example, as also shown in FIG. 2A, a third feature set associated with a visibility condition may include a first feature of "wipers?" indicating whether the image depicted an operation of a windshield wiper of the vehicle, a second feature of windshield indicating whether any objects are present on the windshield, a third feature of object visibility indicating a clarity and/or level of focus (e.g., sharp, obscured, obstructed, and/or blurry, among other examples) of an object (e.g., another vehicle, a traffic sign, and/or a building, among other examples) depicted in the image, and so on.

As shown by reference number 215, a set of observations may be associated with a target variable. The target variable may represent a variable that is selectable from one of multiple options (e.g., one of multiples classes, classifications, or labels), may represent a variable having a numeric value, may represent a variable having a numeric value that falls within a range of values or has some discrete possible values, and/or may represent a variable having a Boolean value. A target variable may be associated with a target variable value, and a target variable value may be specific to an observation. In example 200, the target variable for the first set of observation is road condition, which has a value of dry, smooth for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown in FIG. 2B, and by reference number 230, the machine learning system may apply the trained machine learning model 225 to a new observation, such as by receiving a new observation and inputting the new observation to the trained machine learning model 225. As shown, the new observation may include a first feature set associated with a road condition and including a first feature of wet/dry, a second feature of surface type, a third feature of surface condition, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of good for the target variable of visibility condition for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an increased likelihood of an occurrence of a harsh driving event cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a limited effect on a likelihood of an occurrence of a harsh driving event cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above.

In this way, the machine learning system may apply a rigorous and automated process to detecting adverse conditions. The machine learning system enables recognition and/or identification of tens, hundreds, thousands, or millions of features and/or feature values for tens, hundreds, thousands, or millions of observations, thereby increasing accuracy and consistency and reducing delay associated with detecting adverse conditions relative to requiring computing resources to be allocated for tens, hundreds, or thousands of operators to manually detect adverse conditions using the features or feature values.

As indicated above, FIGS. 2A and 2B are provided as an example. Other examples may differ from what is described in connection with FIGS. 2A and 2B.

Figure 3:
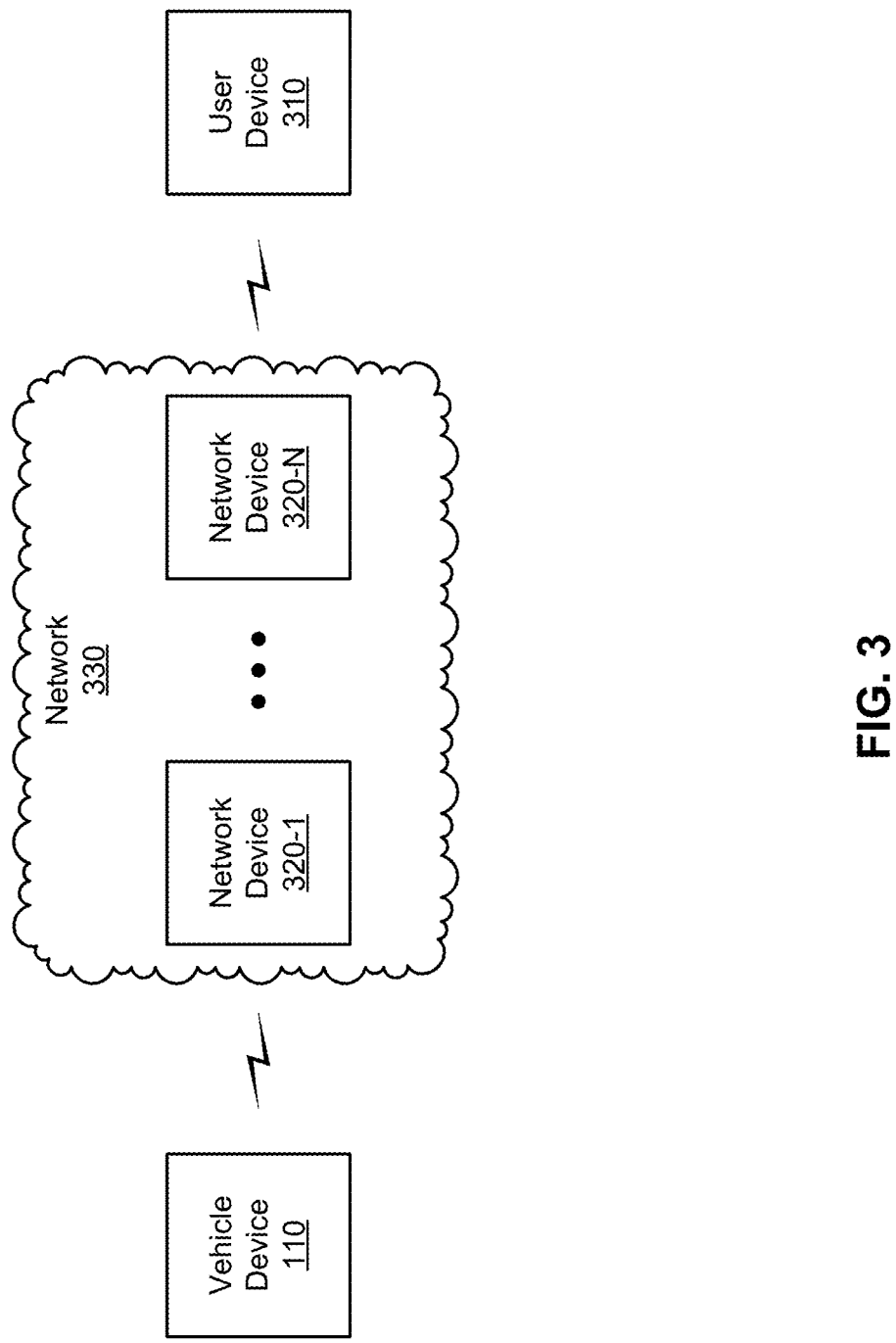
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a vehicle device 110, a user device 310, a group of network devices 320 (shown as network device 320-1 through network device 320-N), and a network 330. Devices of environment 300 may interconnect via wired connections, wireless connections, or a combination of wired and wireless connections.

The vehicle device 110 may include one or more devices capable of receiving, generating, storing, processing, and/or providing information, such as information described herein. For example, the vehicle device 110 may include a mobile phone (e.g., a smart phone, a radiotelephone, etc.), a laptop computer, a tablet computer, a handheld computer, a device included in vehicle 110 (e.g., an inertial measurement unit, a three-axis accelerometer, a global positioning system (GPS) device, an on-board diagnostic (OBD) device, an ECU, a dash camera, a parking assist camera, a backup assist camera, and/or the like) or a similar type of device.

The user device 310 includes one or more devices capable of receiving, generating, storing, processing, and/or providing information such as information described herein. The user device 310 may include a communication device and/or a computing device. For example, the user device 310 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

Network device 320 includes one or more devices capable of receiving, processing, storing, routing, and/or providing traffic (e.g., a packet or other information or metadata) in a manner described herein. In some implementations, the network device 320 may include an edge device of a MEC environment. In a MEC environment, computing is enabled by a network architecture that provides computing capabilities to a connected device (e.g., a vehicle device 110 and/or a user device 310, among other examples) via computing platforms at or near an edge of a network (e.g., network 330). In some implementations, the network device 320 may include a router, such as a label switching router (LSR), a label edge router (LER), an ingress router, an egress router, a provider router (e.g., a provider edge router or a provider core router), a virtual router, or another type of router. Additionally, or alternatively, the network device 320 may include a gateway, a switch, a firewall, a hub, a bridge, a reverse proxy, a server (e.g., a proxy server, a cloud server, or a data center server), a load balancer, and/or a similar device. In some implementations, the network device 320 may be a physical device implemented within a housing, such as a chassis. In some implementations, the network device 320 may be a virtual device implemented by one or more computer devices of a cloud computing environment or a data center.

Network 330 includes one or more wired and/or wireless networks. For example, network 330 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
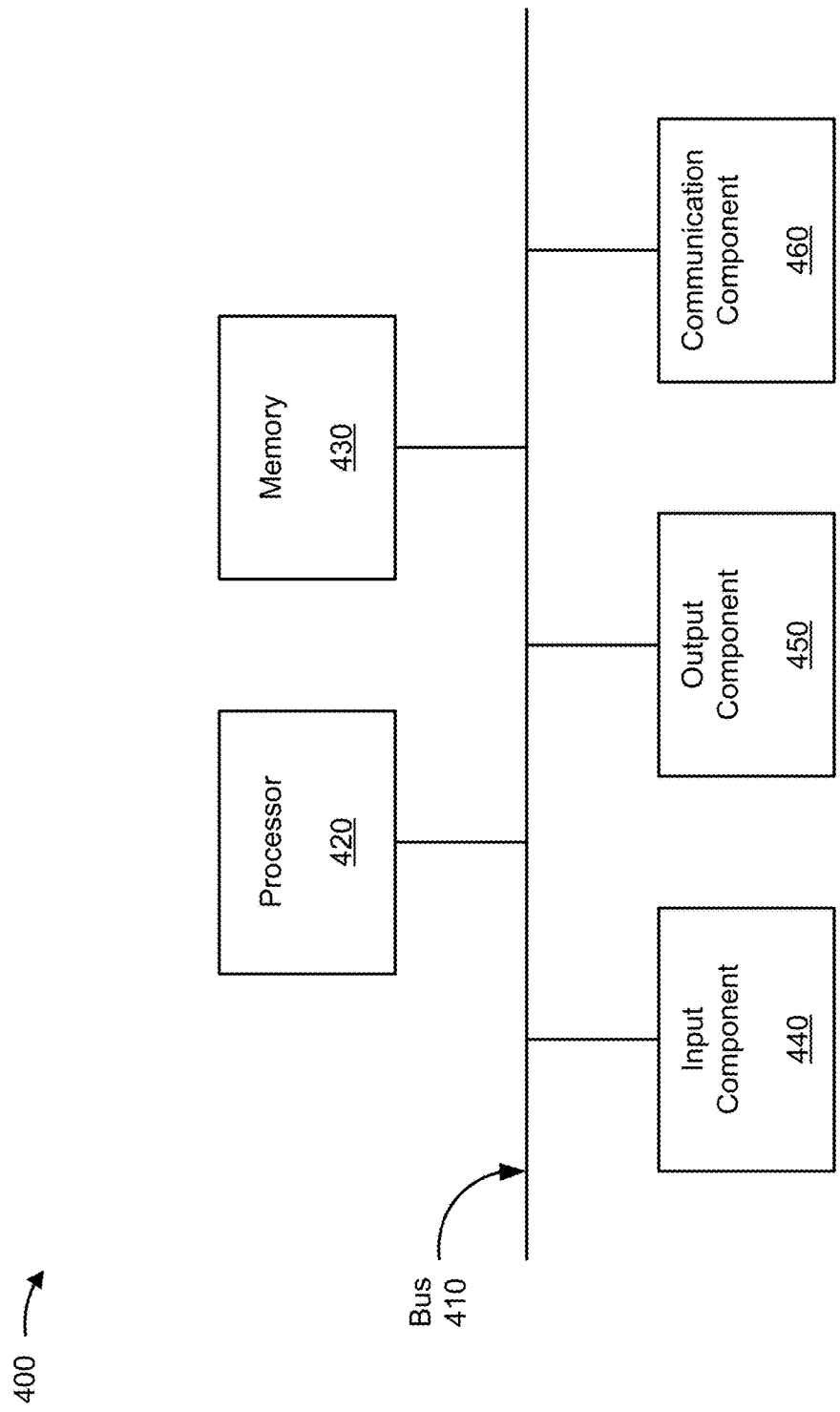
FIG. 4 is a diagram of example components of one or more devices of FIG. 3.

FIG. 4 is a diagram of example components of a device 400, which may correspond to the adverse environment detection system 105, the vehicle device 110, and/or the user device 330. In some implementations, the adverse environment detection system 105, the vehicle device 110, and/or the user device 330 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with systems and methods for utilizing machine learning to detect adverse conditions. In some implementations, one or more process blocks of FIG. 5 may be performed by a device (e.g., the adverse environment detection system 105). In some implementations, one or more process blocks of FIG. 5 may be performed by another device or a group of devices separate from or including the device, such as a vehicle device (e.g., the vehicle device 110), and/or a user device (e.g., the user device 330). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving an image of a road scene (block 510). For example, the device may receive an image of a road scene associated with a vehicle, as described above.

As further shown in FIG. 5, process 500 may include determining a set of features associated with the image based on providing the image to a model (block 520). For example, the device may determine a set of features associated with the image based on providing the image to an initial portion of a model, as described above. In some implementations, the initial portion of the model may include a neural network, such as a CNN. Alternatively, and/or additionally, one or more of the first processing layer, the second processing layer, or the third processing layer may include a multi-layer perceptron.

As further shown in FIG. 5, process 500 may include determining a set of conditions associated with the image based on providing the set of features to a plurality of processing layers of the model (block 530). For example, the device may determine a first condition associated with the image based on providing the set of features to a first processing layer of the model, a second condition associated with the image based on providing the set of features to a second processing layer of the model, and a third condition associated with the image based on providing the set of features to a third processing layer of the model, as described above. In some implementations, the first processing layer, the second processing layer, and the third processing layer process the set of features in parallel.

In some implementations, the first condition may indicate a road condition of a road associated with the image. The second condition may indicate a weather condition associated with the image. The third condition may indicate a visibility condition associated with the image.

As further shown in FIG. 5, process 500 may include performing one or more actions based on the set of conditions (block 540). For example, the device may perform one or more actions based on the first condition, the second condition, and the third condition, as described above.

In some implementations, performing the one or more actions includes modifying the image of the road scene to include information indicating the first condition, the second condition, and the third condition and to generate a modified image, and providing the modified image to a user device associated with the vehicle. In some implementations, performing the one or more actions includes determining a likelihood of a harsh driving event based on the first condition, the second condition, and the third condition and providing information indicating the likelihood of the harsh driving event, the first condition, the second condition, and/or the third condition to a vehicle device and/or a user device associated with the vehicle.

In some implementations, the device may receive training data associated with images of road scenes. The device may train, based on the training data, the first processing layer to determine the first condition, the second processing layer to determine the second condition, and the third processing layer to determine the third condition. In some implementations, the device may train the first processing layer, the second processing layer, and the third processing layer in parallel.

In some implementations, performing the one or more actions comprises providing information identifying the first condition, the second condition, and the third condition to a user device, receiving feedback associated with one or more of the first condition, the second condition, or the third condition based on providing the information identifying the first condition, the second condition, and the third condition to the user device, and retraining the model based on the feedback.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising: receiving, by a device, an image of a road scene associated with a vehicle; determining, by the device, a set of features associated with the image based on providing image data corresponding to the image to an initial portion of a model; determining, by the device, a first condition associated with the image based on providing the set of features to a first processing layer of the model, a second condition associated with the image based on providing the set of features to a second processing layer of the model, and a third condition associated with the image based on providing the set of features to a third processing layer of the model, wherein the first condition indicates a road condition of a road associated with the image, the second condition indicates a weather condition associated with the image, and the third condition indicates a visibility condition associated with the image, wherein the first processing layer comprises a plurality of sequential, linear layers, wherein a quantity of neurons included a first linear layer of the plurality of sequential, linear layers is based on a quantity of features included in the set of features and computing resources of the device, and wherein a quantity of neurons included in a last linear layer of the plurality of sequential, linear layers is based on a task associated with determining the first condition, and wherein the first processing layer, the second processing layer, and the third processing layer process the set of features in parallel; and performing, by the device, one or more actions based on the first condition, the second condition, and the third condition.

2. The method of claim 1, wherein the image of the road scene is captured by a dashcam of a vehicle,
   wherein the model includes a neural network having a quantity of layers that is less than, or equal to, 25, and
   wherein determining the first condition associated with the image based on providing the set of features to the first processing layer of the model, the second condition associated with the image based on providing the set of features to the second processing layer of the model, and the third condition associated with the image based on providing the set of features to the third processing layer of the model includes:
   processing, by the first linear layer, the set of features to generate a plurality of different combinations of features included in the set of features.

3. The method of claim 1, further comprising:
   receiving training data associated with images of road scenes; and
   training, in parallel and based on the training data:
   the first processing layer to determine the first condition,
   the second processing layer to determine the second condition, and
   the third processing layer to determine the third condition.

4. The method of claim 1, wherein performing the one or more actions includes:
   determining a likelihood of a harsh driving event based on the first condition, the second condition, and the third condition.

5. The method of claim 1, wherein the initial portion of the model includes a convolutional neural network (CNN) and one or more of the first processing layer, the second processing layer, or the third processing layer includes a multi-layer perceptron.

6. The method of claim 1, wherein performing the one or more actions comprises:
   providing information identifying the first condition, the second condition, and the third condition to a user device;
   receiving feedback associated with one or more of the first condition, the second condition, or the third condition based on providing the information identifying the first condition, the second condition, and the third condition to the user device; and
   retraining the model based on the feedback.

7. The method of claim 1, wherein performing the one or more actions comprises: modifying the image of the road scene to include information indicating the road condition, the weather condition, and the visibility condition and to generate a modified image; and providing the modified image to a user device associated with the vehicle.

8. A device, comprising: one or more processors configured to: receive an image of a road scene associated with a vehicle; determine a set of features associated with the image based on providing image data corresponding to the image to an initial portion of a model; determine a first condition associated with the image based on providing the set of features to a first processing layer of the model, a second condition associated with the image based on providing the set of features to a second processing layer of the model, and a third condition associated with the image based on providing the set of features to a third processing layer of the model, wherein the first condition indicates a road condition of a road associated with the image, the second condition indicates a weather condition associated with the image, and the third condition indicates a visibility condition associated with the image, wherein the first processing layer comprises a plurality of sequential, linear layers, wherein a quantity of neurons included a first linear layer of the plurality of sequential, linear layers is based on a quantity of features included in the set of features and computing resources of the device, and wherein a quantity of neurons included in a last linear layer of the plurality of sequential, linear layers is based on a task associated with determining the first condition, and wherein the first processing layer, the second processing layer, and the third processing layer process the set of features in parallel; and perform one or more actions based on the first condition, the second condition, and the third condition.

9. The device of claim 8, wherein the first condition indicates a road condition of a road associated with the image, the second condition indicates a weather condition associated with the image, and the third condition indicates a visibility condition associated with the image, and wherein the one or more processors, to perform the one or more actions, are configured to: modify the image of the road scene to include information indicating the road condition, the weather condition, and the visibility condition and to generate a modified image; and provide the modified image to a user device associated with the vehicle.

10. The device of claim 8, wherein the one or more processors are further configured to:
receive training data associated with images of road scenes; and
train, in parallel and based on the training data:
the first processing layer to determine the first condition,
the second processing layer to determine the second condition, and
the third processing layer to determine the third condition.

11. The device of claim 8, wherein at least one of the initial portion, the first processing layer, the second processing layer, or the third processing layer is included in a vehicle device associated with the vehicle.

12. The device of claim 8, wherein the initial portion of the model includes a convolutional neural network (CNN) and one or more of the first processing layer, the second processing layer, or the third processing layer includes a multi-layer perceptron that includes two linear layers.

13. The device of claim 8, wherein the one or more processors, to perform the one or more actions, are configured to:
provide information identifying the first condition, the second condition, and the third condition to a user device;
receive feedback associated with one or more of the first condition, the second condition, or the third condition based on providing the information identifying the first condition, the second condition, and the third condition to the user device; and
retrain the model based on the feedback.

14. A non-transitory computer-readable medium storing a set of instructions, the set of instructions comprising: one or more instructions that, when executed by one or more processors of a device, cause the device to: receive an image of a road scene associated with a vehicle; determine a set of features associated with the image based on providing image data corresponding to the image to an initial portion of a model; determine a first condition associated with the image based on providing the set of features to a first processing layer of the model, a second condition associated with the image based on providing the set of features to a second processing layer of the model, and a third condition associated with the image based on providing the set of features to a third processing layer of the model, wherein the first condition indicates a road condition of a road associated with the image, the second condition indicates a weather condition associated with the image, and the third condition indicates a visibility condition associated with the image, wherein the first processing layer comprises a plurality of sequential, linear layers, wherein a quantity of neurons included a first linear layer of the plurality of sequential, linear layers is based on a quantity of features included in the set of features and computing resources of the device, and wherein a quantity of neurons included in a last linear layer of the plurality of sequential, linear layers is based on a task associated with determining the first condition, and wherein the first processing layer, the second processing layer, and the third processing layer process the set of features in parallel; and perform one or more actions based on the first condition, the second condition, and the third condition.

15. The non-transitory computer-readable medium of claim 14, wherein the one or more instructions, that cause the device to perform the one or more actions, cause the device to:
modify the image of the road scene to include information indicating the first condition, the second condition, and the third condition and to generate a modified image; and
provide the modified image to a user device associated with the vehicle.

16. The non-transitory computer-readable medium of claim 14, wherein the one or more instructions further cause the device to:
receive training data associated with images of road scenes; and
train, in parallel and based on the training data:
the first processing layer to determine the first condition,
the second processing layer to determine the second condition, and
the third processing layer to determine the third condition.

17. The non-transitory computer-readable medium of claim 14, wherein at least one of the initial portion, the first processing layer, the second processing layer, or the third processing layer is included in a vehicle device associated with the vehicle.

18. The non-transitory computer-readable medium of claim 14, wherein at least one of the initial portion, the first processing layer, the second processing layer, or the third processing layer is included in an edge device of a network.

19. The non-transitory computer-readable medium of claim 14, wherein the initial portion of the model includes a convolutional neural network (CNN) and one or more of the first processing layer, the second processing layer, or the third processing layer includes a multi-layer perceptron that includes two linear layers.

20. The non-transitory computer-readable medium of claim 14, wherein the one or more instructions, that cause the device to perform the one or more actions, cause the device to: determine a likelihood of a harsh driving event based on the first condition, the second condition, and the third condition.

* * * * *